United States Patent

Butherus et al.

[15] 3,700,975

[45] Oct. 24, 1972

[54] DOUBLE LAYER CAPACITOR WITH LIQUID ELECTROLYTE

[72] Inventors: Alexander Duane Butherus; Kenneth Russ Newby, both of Murray Hill, N.J.

[73] Assignee: Bell Telephone Laboratories Incorporated, Murray Hill, N.J.

[22] Filed: Nov. 12, 1971

[21] Appl. No.: 198,320

[52] U.S. Cl. .................. 317/230, 317/231, 252/62.2
[51] Int. Cl. ............................................. H01g 9/00
[58] Field of Search ...... 317/230, 231, 233; 252/62.2

[56] References Cited

UNITED STATES PATENTS

| | | |
|---|---|---|
| 3,288,641 | 11/1966 | Rightmire .................. 317/231 |
| 3,443,997 | 5/1969 | Argue et al. .................. 136/83 |
| 3,652,902 | 3/1972 | Hart .......................... 317/230 |

*Primary Examiner*—James D. Kallam
*Attorney*—R. J. Guenther et al.

[57] ABSTRACT

A capacitor utilizing the space charge polarization effect is described. The device employs a liquid electrolyte, resulting in a high capacitance-to-volume ratio, and a higher voltage than usually found in such devices. The capacitor is intended primarily for use in filter applications in transistor circuits.

10 Claims, 2 Drawing Figures

PATENTED OCT 24 1972　　3,700,975

3,700,975

DOUBLE LAYER CAPACITOR WITH LIQUID ELECTROLYTE

BACKGROUND OF THE INVENTION

1. Field of the Invention

The invention is concerned with capacitors, and, more particularly, with a capacitor utilizing the space charge polarization effect.

2. Description of the Prior Art

The history of capacitors involves the attempts to produce smaller sizes, with higher capacitance-to-volume ratios. Thus, capacitors using air as a dielectric were eventually succeeded by capacitors using mica, paper, mylar film and the like, since these materials have a higher dielectric constant than air. Metal oxide films (of the so-called valve metals) also were introduced with these goals in mind. More recently, attempts to achieve capacitors of smaller size have been aided by reduced voltage requirements as transistor circuitry has come into widespread use.

As a result of these considerations, the practical use of the space charge polarization effect (also known as the double layer effect) in capacitors has become attractive. A phenomenon that has been known for several years, the space charge (or interfacial) polarization effect may be briefly described as the trapping of charged carriers that have the ability to migrate through a dielectric medium. The trapping occurs at the interface between the dielectric and the electrode because the charged carriers cannot be freely discharged or replaced at the electrodes. Such a buildup of charges leads to the creation of a space charge layer, and appears to the outside observer as an increase in the capacitance of the sample.

A capacitor utilizing the space charge polarization effect is already in commercial production; however, it uses a solid electrolyte of the $RbAg_4I_5$-type, in which ionic conduction occurs. While having the desired high capacitance, that capacitor is limited in its ability to withstand voltage, and in fact has a voltage breakdown of about 0.7 volts.

SUMMARY OF THE INVENTION

In accordance with the invention, a space charge polarization, or double layer, capacitor using particular combinations of nonaqueous electrolytes with inorganic salts and electrode materials is described, exhibiting a voltage breakdown of from 3 to 5 volts.

The liquid electrolyte is comprised of a nonionizable organic solvent and a soluble, ionizable inorganic salt. A polarizable electrode is used as the anode, while a non-polarizable electrode is used as the cathode. A capacitance to tens of farads in volumes less than 1 cubic inch can be achieved with the inventive device.

Detailed Description of the Invention

1. Mechanism of Operation

Figure 1:
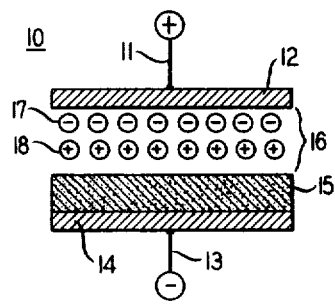
FIG. 1 is a cross-section of a double layer capacitor utilizing the space charge effect to which reference is made in Section 1 of the Detailed Description—Mechanism of Operation.

Referring to FIG. 1, charged carriers (not shown) are able to migrate for some distance through a bulk electrolyte 15 under the influence of a field across electrodes 12 and 14. Such carriers may be impeded in their motion by becoming trapped at the interface between the electrolyte and an electrode 12 if they cannot be freely discharged or replaced at the electrode. As a result, charged carriers (or ions) 17 and 18 accumulate and form a space charge layer 16. The creation of the space charge layer, or double layer, leads to an increase in the capacitance of the sample. See, for example, *Anodic Oxide Films*, pp. 345–348, by L. Young, Academic Press (1961) and *Dielectrics and Waves*, p. 228, by Arthur von Hipple, John Wiley & Sons (1954).

2. The Capacitor

The capacitor, like any other capacitor, is comprised of two electrodes and a dielectric. Here, one of the electrodes is substantially polarizable and the other electrode is substantially non-polarizable. While both electrodes could be polarizable, the resulting capacitance would be half that of the device prepared in accordance with the invention, since such configuration would be equivalent to two capacitors in series.

The dielectric is obtained from the space charge layer accumulated at the interface between the polarizable electrode and an electrolyte. The electrolyte is composed of (1) an aprotic organic solvent having a relatively high dielectric constant and (2) an ionizable inorganic salt. An aprotic (lacking any ionizable hydrogen) composition is required to prevent low voltage breakdown of the device which would otherwise result from the liberation of hydrogen gas at the non-polarizable electrode. The combination of solvent and solute forms an electrolyte that is capable of supporting both ion migration through the solution and an interface of trapped ions (the dielectric) at the polarizable electrode.

a. The Polarizable Electrode

The polarizable electrode is one on which substantially no electrochemical reactions are possible with any of the electrolytic species over the operating voltage range of the capacitor. A high surface area is most effective for achieving a high capacitance-to-volume ratio; the high surface area can be obtained by employing finely divided materials (e.g., platinum or carbon) or a sintered mass (e.g., non-stoichiometric electronically conducting metal oxides such as $TiO_{2+x}$, $VO_{2+x}$ and $Na_xWO_3$, transition metal nitrides such as TiN, or transition metal borides such as $ZrB_2$). The maximum resistivity limit acceptable for the polarizable electrode is 1 ohm-centimeter; otherwise the frequency response decreases to an unacceptably low value. The use of carbon formed in such a way as to have a high surface area for increased capacitance is preferable for its relatively low cost.

b. The Nonpolarizable Electrode

The nonpolarizable (or reversible) electrode is one usually composed of a metal, which is in electrochemical equilibrium with ions of the same chemical identity dissolved in the electrolyte. For the purposes of the invention, it is preferable to use a metal having a high oxidation potential in order to approach the ideally non-polarizable state. Compared with the standard hydrogen electrode, where E°, the oxidation potential, is 0.00 v., the following metallic elements are useful as the nonpolarizable electrode in the practice of the invention (E° is given in parentheses): lithium (3.045 v.), potassium (2.925 v.), rubidium (2.925 v.), cesium (2.923 v.), barium (2.90 v.), strontium (2.89 v.), calcium (2.87 v.) and magnesium (2.37 v.). This list, taken from Day and Selbin, *Theoretical Inorganic Chemistry*, pp. 226–230, is not all-inclusive; rather, it serves to indicate some of the elements useful in the practice of the invention. It is expected, however, that the metal used will be one of the members of Groups IA or IIA of the Periodic Table of Elements, because of their relatively high oxidation potential values. Limitations as to the selection of the proper electrode are a function of the electrolyte used and are discussed below.

c. The Electrolyte

The electrolyte of the invention is composed of an organic solvent and an ionizable inorganic salt. For the purposes of the invention, the solvent must be aprotic and cannot contain water in an amount greater than about 50 parts per million because of the low breakdown strength of water (−1.229 volts). The presence of ionizable hydrogen will also lead to low voltage breakdown, while the presence of water will additionally react with the active metal electrode to generate at least a partial passivating film of oxide on that metal, thereby increasing its polarizability. The electronic conductivity of the electrolyte must be less than $1 \times 10^{-5}$ (ohm-centimeters)$^{-1}$ and preferably less than $1 \times 10^{-6}$ (ohm-centimeters)$^{-1}$; this permits operation of the capacitor at 10 to 12 kilohertz frequencies. At values greater than those specified, the double layer will be electronically discharged, which is analogous to the existence of leakage current in an ordinary capacitor. In addition, the dielectric constant of the solvent must be at least 30 (relative to vacuum) in order to maintain an isolation of charge carriers. Below a value of about 30, ions begin to pair up, with a resulting decrease in the capacitance per double layer thickness.

The following solvents have been found to meet the minimum requirements of the invention: propylene carbonate, dimethyl sulfoxide, dimethyl sulfite, tetrahydrofuran, nitromethane, and butyrolacetone.

The inorganic salt chosen is constrained by two considerations: (1) the elemental cation must be chemically identical to the elemental nonpolarizable electrode, and (2) the anion must be electrochemically inert at the operating potential of the capacitor.

If carbon is used as the polarizable electrode, an additional constraint must be considered: the anion must be sufficiently bulky to withstand intercalation into the graphite lattice. Intercalation creates a distortion of the lattice structure, which in turn dissipates the double layer, causing the capacitor to lose capacitance. Examples of anions useful in preventing intercalation where carbon is used as the polarizable electrode include $PF_6^-$, $BF_4^-$, $BH_4^-$, $AlH_4^-$, and $CNS^-$. These anions have an effective ionic radius of at least 2.4 Angstroms, as compared with such anions as $Cl^-$ (1.81 Angstroms), $Br^-$ (1.96 Angstroms), and $ClO_4^-$ (2.36 Angstroms).

For polarizable electrodes other than carbon, the intercalation problem does not exist, so there is no need to restrict the anion size. Accordingly, in addition to the above anions halides, perhalates, sulfates, phosphates, and the like are also useful anions.

The highest capacitance of the capacitor is obtained from presence of a high number of charge carriers per unit volume, which in turn occurs at relatively high concentrations of the electrolyte. The minimum concentration has been determined to be 0.1 molal; the preferred concentration is at least 1.0 molal. Examples of complete capacitors are given below in this disclosure; these examples include the materials used for the electrodes, the composition and properties of the electrolyte, and the capacitance obtained.

d. The Dielectric

The dielectric consists of the double-layer of ionic charges formed at the anode (the ideally polarizable electrode in the invention) when a potential difference is applied to the two electrodes. This double-layer of charges is organized at the interface of the anode and the electrolyte and is comprised of alternating layers of negative and positive charges. However, in reality, only the first two such layers are highly organized, the rest being increasingly randomized by diffusion, convection currents, and so forth. It is due to the presence of these first two layers that the name "double-layer capacitor" is given to capacitors based on this mechanism of operation.

3. The Figures

FIG. 1 shows a double-layer capacitor 10, consisting of an electrically conducting lead 11 connected to an ideally polarizable electrode 12, an electrically conducting lead 13 connected to an ideally nonpolarizable electrode 14, and an electrolyte 15. When lead 11 is positively biased and lead 13 is negatively biased, ions 17 and 18 in the bulk electrolyte 15 in the vicinity of the electrode 12 organize and form a space charge layer 16 (the dielectric) which is composed of alternating layers of negatively charged ions 17 and positively charged ions 18. In FIG. 1, one layer of each type of ion is shown. By virtue of the positive charge on the electrode 12, negative charges 17 are attracted to it.

Figure 2:
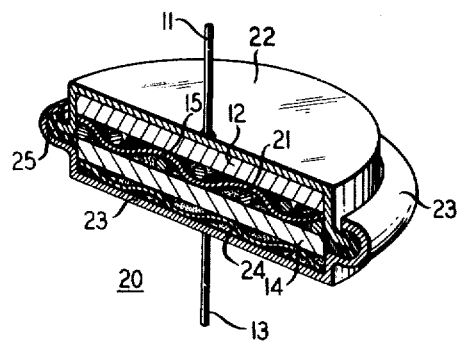
FIG. 2 is a perspective view of one form that this capacitor might assume in commercial production.

In FIG. 2, capacitor 20 represents one form that could conceivably be used in a commercial device. An inert spacer 21, which is shown here as a woven material, is used to separate the polarizable electrode 12 and the nonpolarizable electrode 14. The electrolyte 15 completely fills the space between the two electrodes. The positively biased lead 11 is connected to a metal container 22 which, in turn, is intimately connected to electrode 12. Negatively biased electrode 13 is connected to a separate metal container 23. An electrically conducting spring 24, located between the metal container 23 and electrode 14, is used to maintain the proper distance between the electrodes 12 and 14. A non-conductive, chemically inert gasket 25 is used to separate the two metal containers 22 and 23 and to form a hermetic seal. Exemplary devices have been made using carbon as the substantially polarizable (non-reactive) electrode 12, lithium as the substantially nonpolarizable (reactive) electrode 14, and propylene carbonate, containing a soluble salt such as lithium hexafluorophosphate, (LiPF$_6$), as the electrolyte 15. The spacer 21, in this case, could, for example, be made of woven polypropylene fibers. Examples of the space charge effect capacitor will be discussed below.

Other forms of this device, common to those already known in the art, may also be visualized, such as, for example, rolled configurations.

4. Examples a. Table I lists the capacitances per unit volume of the polarizable electrode; the values were obtained at 1 kilohertz for a series of lithium salts dissolved in various organic solvents. The water content of each solvent was less than 20 parts per million. With the exception of nitromethane, in which the concentration of the solute was less than 1 molar, all solutions were prepared at a concentration of 1 molar. Moderately high surface area carbon (0.76 square meters per gram) was employed as the polarizable electrode, while a ½ × 0.060 inch ribbon of lithium served as the nonpolarizable electrode.

TABLE I

Capacitance, farads per cubic inch for moderately high surface area carbon electrode:

| Solvent | Solute | | |
| --- | --- | --- | --- |
|  | $LiPF_6$ | $LiBF_4$ | LiCNS |
| propylene carbonate | 1.3 | 1.2 | 1.35 |
| dimethyl sulfoxide | 1.2 | 1.15 | 1.25 |
| dimethyl sulfite | 1.25 | 1.3 | 1.3 |
| tetrahydrofuran | 1.18 | 1.1 | 1.05 |
| nitromethane* | 0.71 | 0.6 | 0.58 |
| butyrolacetone | 1.3 | 1.12 | 1.25 |

*Concentrated solution of solvent in solute used.

b. Table II lists the capacitances obtained under identical conditions as in Example (a), except that very high surface area carbon (about 100 square meters per gram) was used as the polarizable electrode.

TABLE II

Capacitance, farads per cubic inch for very high surface area carbon electrode:

| Solvent | Solute | | |
| --- | --- | --- | --- |
|  | $LiPF_6$ | $LiBF_4$ | LiCNS |
| propylene carbonate | 72 | 64 | 76 |
| dimethyl sulfoxide | 68 | 53 | 56 |
| dimethyl sulfite | 64 | 66 | 62 |
| tetrahydrofuran | 59 | 52 | 47 |
| nitromethane* | 42 | 40 | 40 |
| butyrolacetone | 74 | 60 | 66 |

*Concentrated solution of solvent in solute used.

What is claimed is:

1. In a capacitor having a first and a second electrode and a liquid electrolyte contacting said first and said second electrodes, said first electrode being non-electrochemically reactive with the electrolyte, and upon application of electrical potential between the electrodes, said first electrode being electrically polarizable with at least one constituent in the electrolyte for producing a space charge layer adjacent said first electrode, said second electrode being electrochemically reactive with the electrolyte and capable of attaining electrochemical equilibrium with ions of the same chemical identity in the the electrolyte, characterized in that said electrolyte is composed of an ionically conducting non-aqueous aprotic solvent-solute system capable of withstanding an electrical non-breakdown stress upon application of potential of at/least 3 volts.

2. The capacitor of claim 1 in which said first electrode is an anode having a maximum resistivity of 1 ohm-centimeter and consists essentially of at least one member selected from the group consisting of carbon, nonstoichiometric electronically conducting metal oxides, transition metal nitrides, transition metal borides, and finely divided metallic platinum.

3. The capacitor of claim 2 in which said first electrode is carbon.

4. The capacitor of claim 1 in which said second electrode is a cathode and consists essentially of at least one element selected from the group consisting of Group IA and Group IIA elements of the Periodic Table.

5. The capacitor of claim 4 in which said second electrode is lithium.

6. The capacitor of claim 1 in which said nonaqueous solvent is aprotic and has a dielectric constant of at least 30, relative to vacuum.

7. The capacitor of claim 6 in which said solvent is at least one member selected from the group consisting of propylene carbonate, dimethyl sulfoxide, dimethyl sulfite, tetrahydrofuran, nitromethane, and butyrolacetone.

8. The capacitor of claim 1 in which the cation of said solute consists essentially of the same element as said second electrode.

9. The capacitor of claim 8 in which the first electrode is carbon and the anion of said solute has an effective ionic radius of at least 2.4 Angstroms and is at least one selected from the group consisting of $PF_6^-$, $BF_4^-$, $BH_4^-$, $AlH_4^-$, and $CNS^-$.

10. The capacitor of claim 8 in which the cation is $Li^+$.

* * * * *